United States Patent [19]

Bower et al.

[11] Patent Number: 5,503,197
[45] Date of Patent: Apr. 2, 1996

[54] METHOD FOR PRODUCING HIGH WEAVE DENSITY AIRBAG FABRIC ON A WATER-JET LOOM USING UNSIZED YARNS

[75] Inventors: Charles L. Bower, LaGrange, Ga.; Marshall L. Huggins, Florence; Jerry Tyler, Lake City, both of S.C.

[73] Assignee: Milliken Research Corporation, Spartanburg, S.C.

[21] Appl. No.: 462,824

[22] Filed: Jun. 5, 1995

Related U.S. Application Data

[63] Continuation-in-part of Ser. No. 219,989, Mar. 30, 1994, Pat. No. 5,421,378.

[51] Int. Cl.[6] .................................................. D03D 47/32
[52] U.S. Cl. ........................... 139/435.1; 280/728.1; 139/188 R; 139/389; 139/100; 428/225; 428/229
[58] Field of Search .................... 139/435.1, 188 R, 139/389, 100, 387 R, 1 R; 280/728.1; 428/225, 229

[56] References Cited

U.S. PATENT DOCUMENTS

| | | | |
|---|---|---|---|
| 3,814,141 | 6/1974 | Iribe et al. | 139/435.1 |
| 4,446,893 | 5/1984 | Gunneman et al. | 139/435.1 |
| 4,921,735 | 5/1990 | Bloch | 139/389 |
| 5,011,183 | 4/1991 | Thornton et al. | 139/389 |
| 5,073,418 | 12/1991 | Thornton et al. | 139/389 |
| 5,110,666 | 5/1992 | Menzel et al. | 428/196 |
| 5,236,775 | 8/1993 | Swoboda et al. | 139/389 |
| 5,259,645 | 11/1993 | Hirabayashi et al. | 280/743.1 |
| 5,277,230 | 1/1994 | Sollars, Jr. | 139/389 |
| 5,296,278 | 3/1994 | Nishmura et al. | 139/389 |

FOREIGN PATENT DOCUMENTS

| | | |
|---|---|---|
| 2061810 | 8/1992 | Canada .................... 139/389 |
| 2129258 | 2/1995 | Canada . |
| 0436950 | 5/1993 | European Pat. Off. . |
| 0636721 | 2/1995 | European Pat. Off. . |
| 4038287 | 6/1991 | Germany . |
| 0442373 | 8/1991 | Germany . |
| 0501295 | 9/1992 | Germany . |
| 2241207 | 8/1991 | United Kingdom . |

*Primary Examiner*—Andy Falik
*Attorney, Agent, or Firm*—Terry T. Moyer; James M. Robertson

[57] ABSTRACT

A method for forming an airbag fabric for use in protecting vehicle occupants during a collision. The airbag fabric includes at least a portion of fabric woven by water-jet weaving yarns without chemical sizing compounds thereon at weave constructions comparable to those available by traditional Rapier weaving processes.

8 Claims, 5 Drawing Sheets

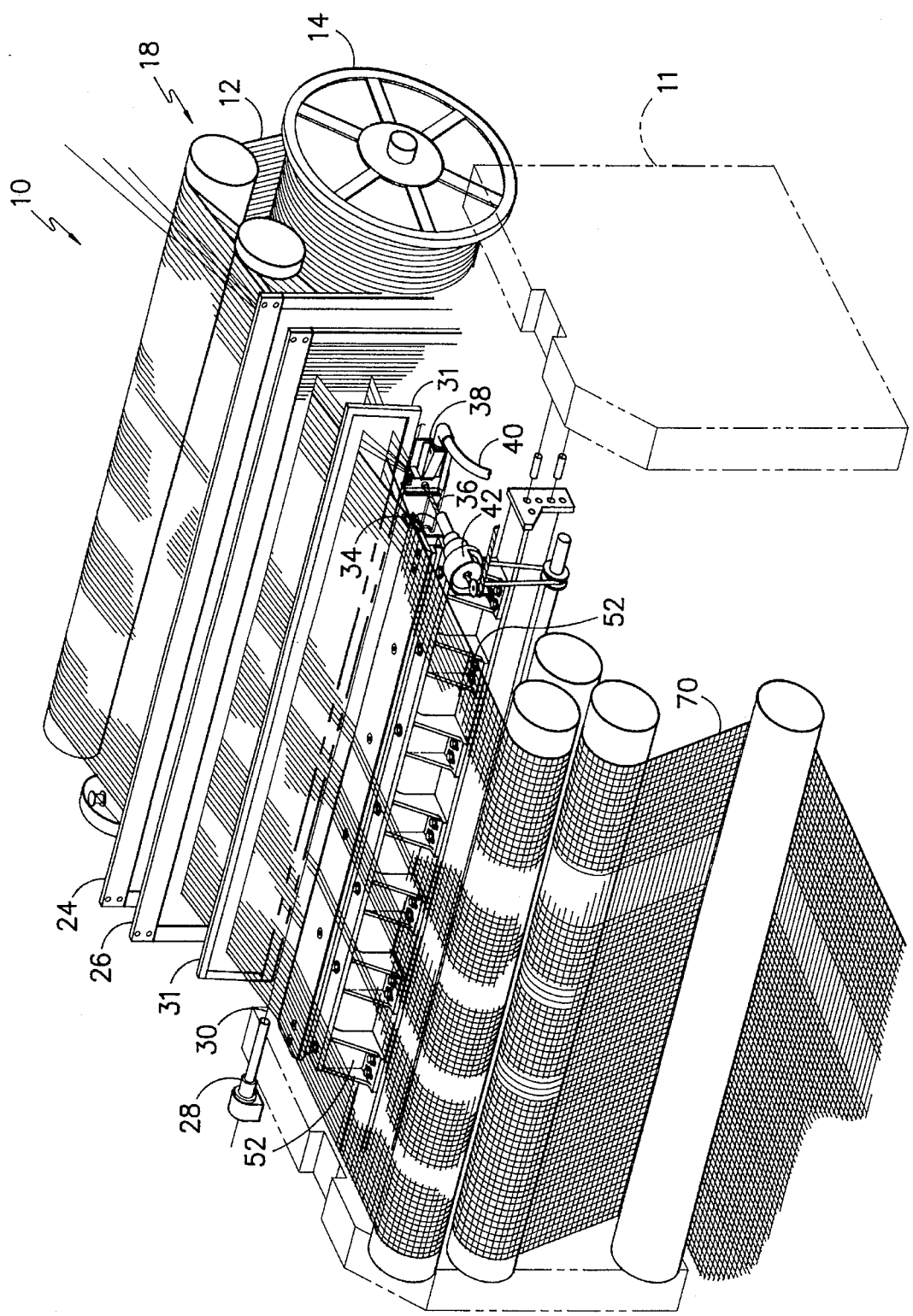

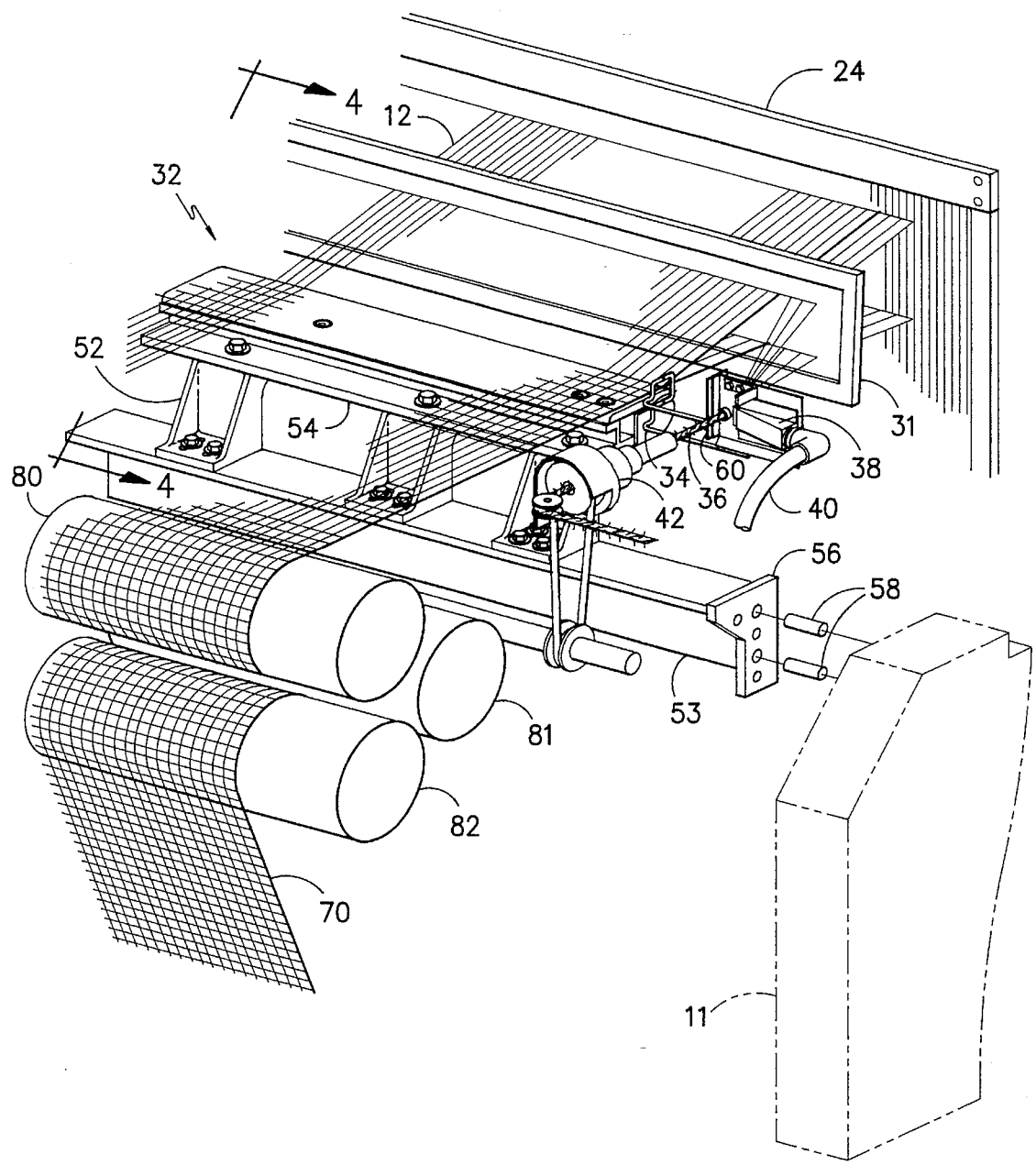
FIG. -2-

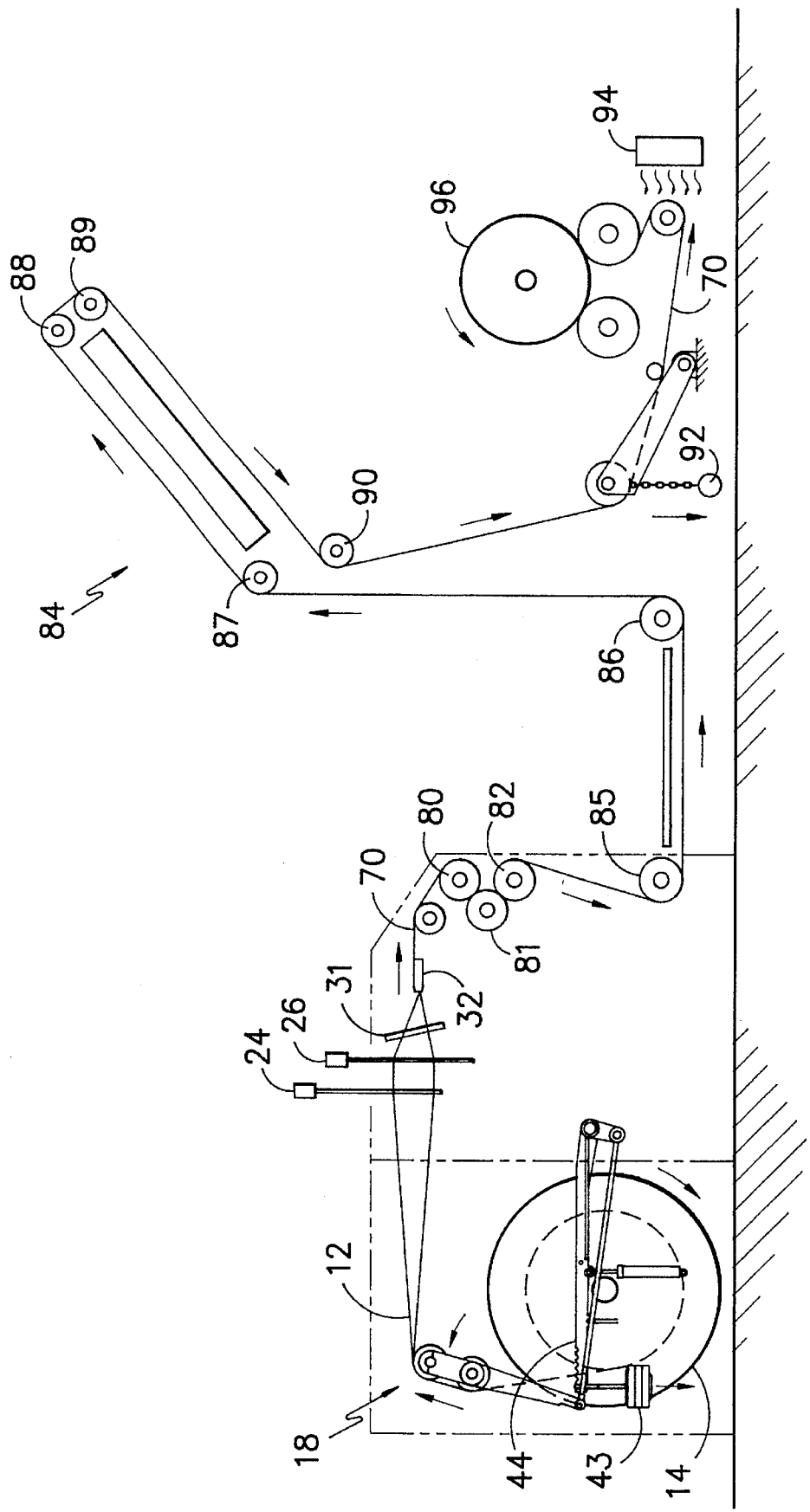
FIG. -3-

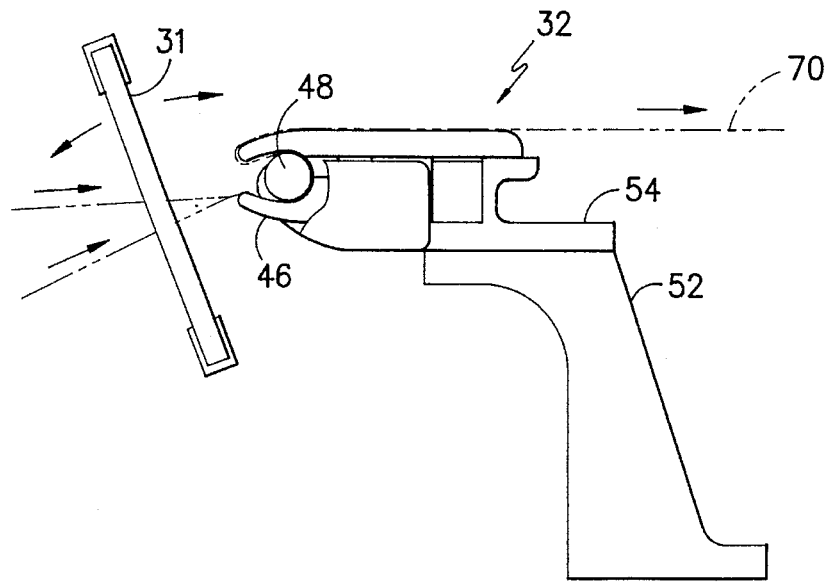
FIG. -4-
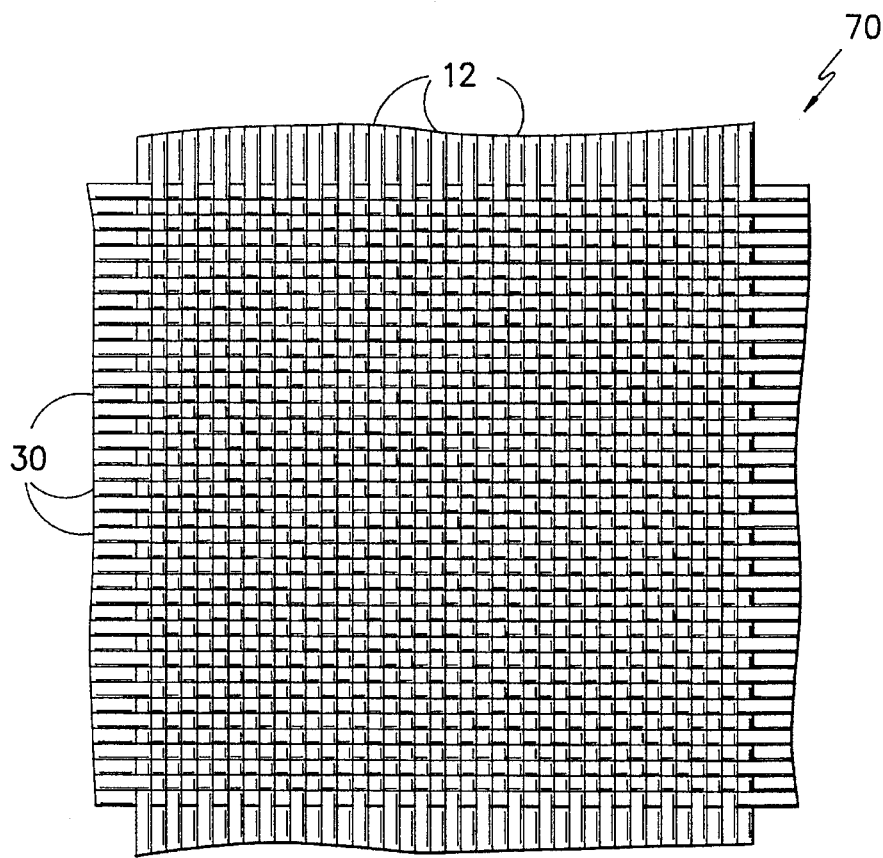
FIG. -5-

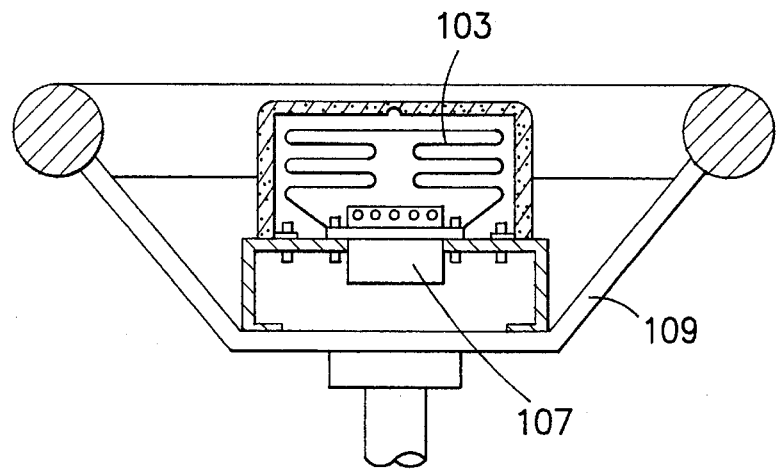
FIG. -6-
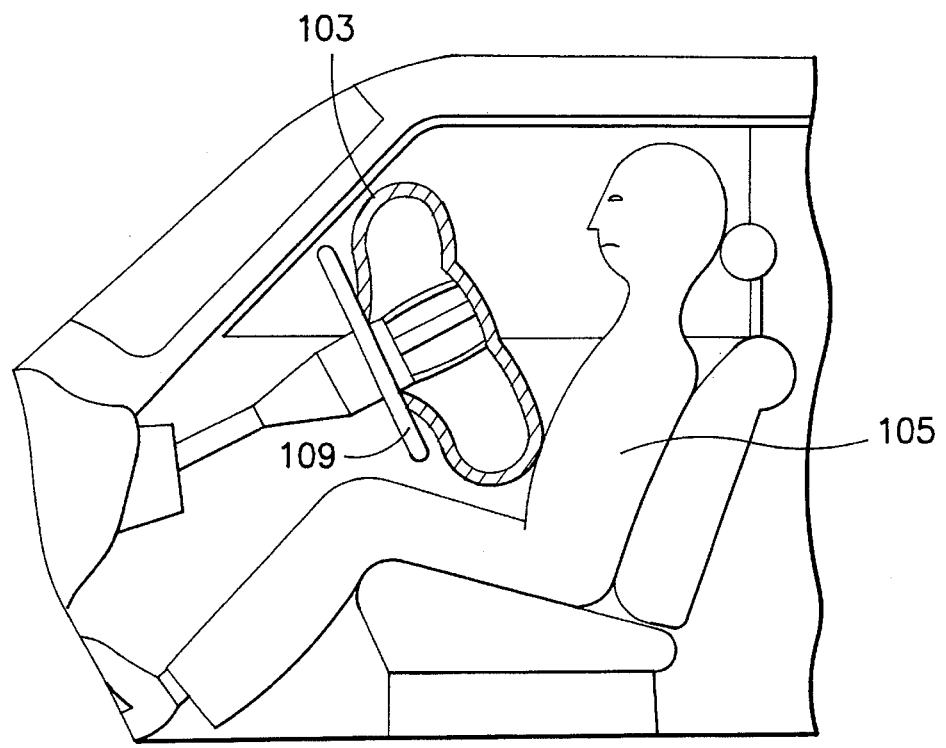
FIG. -7-

METHOD FOR PRODUCING HIGH WEAVE DENSITY AIRBAG FABRIC ON A WATER-JET LOOM USING UNSIZED YARNS

CROSS-REFERENCE TO RELATED APPLICATION

This application is a Continuation-In-Part of our co-pending application Ser. No. 08/219,989 filed Mar. 30, 1994 U.S. Pat. No. 5,421,378.

FIELD OF THE INVENTION

The present invention relates generally to the construction of airbags and airbag fabrics for use in restraining vehicle occupants during collisions and more particularly to airbags formed from water-jet woven fabrics unsized yarn woven at high densities.

BACKGROUND

Airbag equipment installed on a fixed portion of an automobile or an airplane body in front of a seated occupant plays an important role in the protection against injury arising due to collision with the fixed portion of the car body or airplane during an accident. Airbags may be produced in a number of manners and from a number of different materials. However, airbags are typically formed, at least in part, from some type of woven textile material. Such textile materials are disclosed in Sollars, Jr. U.S. Pat. Nos. 5,277,230 to Sollars, Jr. issued Jan. 11, 1994; 5,259,645 to Hirabayashi, et al. issued Nov. 9, 1993; 5,110,666 to Menzel, et al. issued May 5, 1992; 5,073,418 to Thornton, et al. issued Dec. 17, 1991; 5,011,183 to Thornton, et al. issued Apr. 30, 1991; 4,921,735 to Bloch issued May 1, 1990; and 3,814,141 to Iribe, et al. issued Jun. 4, 1974. The teachings of all of which are incorporated herein by reference.

Historically, fabrics for use in vehicle airbags have typically been formed using conventional Rapier weaving machines wherein the pick yarn is drawn mechanically across the warp. Such weaving practices have been successful in producing the high weave density, i.e. pick count, which is desired for structural stability in the fabric used to withstand inflation and collision forces when the airbag is deployed during an accident. Unfortunately, typical Rapier weaving machines are significantly slower than alternative weaving technology such as water-jet weaving.

In water-jet weaving, the pick yarn is drawn through the shed of the warp yarns by means of a stream of water which represents a much faster method of insertion than the mechanical Rapier. Heretofore, airbag fabrics incorporating yarn of approximately 420 denier have been woven on water-jet weaving machines at a maximum weave density of approximately 46×46 (warp×fill). Likewise, airbag fabrics incorporating yarn of about 630 denier have been woven on water-jet weaving machines at a maximum weave density of approximately 38×38 and airbag fabrics of about 840 denier or greater have been woven at a maximum weave density of about 33×33. As will be appreciated by those with skill in the art, these constructions are lighter than the typical fabric woven on conventional Rapier weaving machines which would be about 49×49 for 420 denier fabric, 41×41 for 630 denier fabric and 36×36 for 840 denier. Historically, in order to compensate for the lower weave density achievable on water-jet weaving machines, the weaving has been performed using yarns having high breaking tenacities so as to provide improved strength in the final fabric despite the lighter weave construction.

As will be appreciated by those of skill in the art, yarns of high tenacity may require slashing with a chemical compound referred to as a sizing compound to enhance the mechanical integrity of the higher tenacity yarns during weaving. When weaving fabric for airbags, the size which is used is typically a polyacrylic acid although other polymers such as polyvinyl alcohol, polystyrene, and polyacetates may likewise be utilized. While the sizing compound is typically effective in enhancing the mechanical integrity of the high tenacity yarn, such sizing also tends to enclose yarn oils which may not be compatible with polymeric compounds used for coating the fabric prior to its formation into an airbag structure. Accordingly, the practice prior to the present invention has been to eliminate the sizing compound as well as the enclosed yarn oils by the scouring and drying of the fabric prior to effecting any coating operation.

As will be recognized, the addition of scouring and drying operations may tend to increase the cost for the overall production of fabric. Thus, it is of useful benefit to provide a fabric which may be used in an airbag and which is woven on a water-jet loom at high weave constructions such as are available on conventional Rapier machines while avoiding the need to use high tenacity yarns with sizing compounds applied thereto. Such an improvement permits the complete elimination of scouring the fabric to remove enclosed yarn oils since the oils are removed within the water stream during the weaving process itself.

SUMMARY OF THE INVENTION

In light of the foregoing, it is a general object of the present invention to provide an airbag and airbag fabric for use in protecting vehicle occupants during a collision, comprising at least a portion of fabric woven by means of water-jet weaving at a weave construction comparable to that available by traditional Rapier weaving machines.

In that respect, it is an object of the present invention to provide an airbag and airbag fabric comprising at least a portion of woven fabric formed by means of water-jet weaving unsized yarn of about 630 denier or greater wherein such woven fabric has a weave construction of about 39 threads per inch or greater in both the warp and the fill directions.

It is a related object of the present invention to provide an airbag and airbag fabric comprising at least a portion of woven fabric formed by means of water-jet weaving unsized yarn of about 840 denier or greater wherein such woven fabric has a weave construction of about 34 threads per inch or greater in both the warp and the fill directions.

BRIEF DESCRIPTION OF THE DRAWINGS

FIG. 1 is an overview perspective of a water-jet weaving machine illustrating several machine modifications believed to enable the production of fabrics having high weave densities on such machines;

FIG. 2 illustrates equipment modifications to the weft cutting and catch selvage take-off for the right selvage waste removal of the water-jet weaving machine illustrated in FIG. 1;

FIG. 3 is a side profile schematic of the weaving machine shown in FIGS. 1 and 2 including the off-loom take-up assembly therefor;

FIG. 4 is a cut-away side view taken generally along line 4—4 of FIG. 2 and illustrating the high-profile bar temple assembly;

FIG. 5 shows a plain weave fabric formed according to the method of the present invention;

FIG. 6 is a schematic cross-section view of a typical airbag installation mounted in a steering wheel; and FIG. 7 is a schematic view showing the airbag of FIG. 6 in an expanded condition.

While the invention may be described and disclosed in connection with certain preferred embodiments and procedures, it is in no way intended to limit the invention to any such specific embodiments. Rather, it is specifically intended to cover all embodiments and modifications as may fall within the true spirit and scope of the invention as defined by the claims appended hereto.

BRIEF DESCRIPTION OF PREFERRED EMBODIMENTS

Now looking to the FIGURES wherein like reference numerals denote like components in the various views, in FIG. 1 there is shown a water jet weaving machine 10 such as a Nissan type LW541 or LW542 available from the textile machinery division of the Nissan Motor Company Ltd. including a base structure 11, for use in delivery of a plurality of warp yarns 12 from a warp beam 14. As illustrated in FIG. 1 and FIG. 3, the warp yarns 12 are passed over a tensioning roll apparatus 18 which is used to adjust the warp tension as described more fully below.

As will be appreciated, approximately half of the warp yarns 12 are passed through a first harness mechanism 24 and approximately half of the warp yarns 12 are passed through at least a second harness mechanism 26. As best illustrated in FIG. 3, the first and second harness mechanisms 24, 26 may be moved up and down with respect to one another so as to adjust the opening or "shed" between the two sets of warp yarns in an alternating manner. By shifting the respective position of each set of warp yarns, a water-jet nozzle 28 may be used to insert a fill yarn 30 on a periodic basis in the shed between the two sets of warp yarns. By coordinating the insertion of the fill yarn 30 with the reciprocating movement of the first and second harness mechanisms 24, 26 a woven structure with the fill yarn overlying and underlying alternating warp yarns may be achieved.

It will be appreciated that once the fill yarn 30 is inserted in appropriate orientation with respect to the warp yarns 12, it is necessary to secure these yarns in place in a relatively secure structure by forcing them against the previously inserted fill yarns by means of a beating process as carried out by a reciprocating reed 31 which separates the warp yarns at the point of fill yarn insertion and beats the fill yarns into place at the bar temple 32 as discussed more fully below in relation to FIG. 4.

As will be readily appreciated by those of skill in the art, once the fill yarn is inserted, it must be cut off at the boundary of the fabric being produced and removed along with the selvage waste. As best illustrated by reference to FIGS. 1 and 2, the cutting at both the right and the left sides of the fabric is preferably performed by means of hot knife cutters 34 based on electrical resistance as opposed to mechanical scissors which have heretofore been utilized. The yarn cut is entrained in the catch cord 36 by suction produced behind a catch plate 38 through vacuum line 40 by a suction pump (not shown). The catch cord with the entrained fill yarn is thereafter passed through a twister head 42 for selvage waste accumulation.

As indicated previously, it is an object of the present invention to provided a water-jet woven fabric with a high pick count. That is, the fabric has a high density of threads in both the warp and the weft direction. Specifically, the present process produces a fabric with a weave density of greater than about 38 threads per inch and preferably between about 39 and 43 threads per inch in both the warp and the fill direction while preferably using yarn having no sizing compound thereon of about 680 denier or less. While similar weave densities have been possible using Rapier weaving machines, prior to the present invention water-jet weaving could only achieve weave densities in this range using yarn of less than about 630 denier. Specifically, it is believed that prior to the present invention yarn of less than about 580 denier was needed to achieve a weave density of 43 threads per inch while less than about 630 denier was needed to achieve a weave density of 38 threads per inch. The present practice thus provide a closer packing of higher denier yarns.

A weave density of greater than 33 threads per inch and preferably 34 to 36 threads per inch may be produced in the present process using yarn up to about 870 denier. It is believed that prior to the present invention, such weave densities could only be achieved in water-jet weaving through use of yarns of less than about 840 denier. Specifically, it is believed that prior to the present invention, yarn of less than about 810 denier was needed to achieve a weave density of 36 threads per inch while less than about 840 denier was needed to achieve a weave density of 33 threads per inch.

The present practice thus permits fabric to be woven from 420 denier yarn at a density of about 47 threads per inch or greater; from 630 denier yarn at a density of about 39 threads per inch or greater; and from 840 denier yarn at a density of about 34 threads per inch or greater.

In one important aspect, it has been determined that increased warp tension beyond that previously used on water-jet weaving machines facilitates in the production of such high weave density fabrics. By way of example only, and not limitation, it has been determined that increasing the warp tensioning from the standard level of about 60 grams per inch to a level of between about 80 and 95 grams per inch is successful in increasing the weave density significantly. As illustrated in FIG. 3, this warp tension is adjusted by adding or removing warp tensioning weights 43 to a tensioning lever arm 44 which, in turn, increases or reduces the tension on the tensioning roll apparatus 18 previously discussed.

As will be readily appreciated by those of skill in the art, a substantial increase in the tension of a large number of warp yarns significantly increases the forces necessary to beat the fill yarn into place. Accordingly, it has been found beneficial to incorporate several further modifications to the water-jet weaving machine as illustrated in FIGS. 1, 2 and 4 to accommodate these higher stresses. In particular, it has been found that the use of a so called high profile bar temple 32 utilizing a chrome or anodized aluminum casing 46 and a nylon threaded rod 48 (FIG. 4) provides the best performance and durability in handling the high warp tension stresses. One bar temple which may be particularly preferred is available from the Lewis P. Batson Company whose address is believed to be 1 Club Road, Box 3978, Greenville, S.C. 29608.

The high profile bar temple 32 is preferably supported by a plurality of temple support brackets 52 extending between the breast beam 54 of the weaving machine and a rear support arm 53 of the bar temple 32. As shown, the breast beam 54 is preferably connected to the frame 11 of the weaving machine by a high strength breast plate 56 using connecting pins 58. In the potentially preferred embodiment, the connecting pins 58 will be at least ⅜ inch in diameter so as to prevent deflection during machine beat-up. It is to be noted that it has also been found beneficial to increase the width of the catch plate arm 60 from the standard width of 10 millimeters to a width of about 25 millimeters to contain any potential fill deflection due to insertion through a higher tension warp.

It is to be understood that following the beating action by the reed 31 at the bar temple 32, a woven fabric 70 is formed having yarns running in both the warp and the fill direction. In a potentially preferred embodiment, the overall pick count as measured in the fill direction may be substantially equivalent to the pick count measured in the warp direction thus yielding a plain weave as shown in FIG. 5.

As indicated previously, in the preferred embodiment, both the warp yarns 12 and the fill yarns 30 will be nonsized. By the term "nonsized" is meant that no sizing compound such as polyacrylic acid, polyvinyl alcohol, polystyrene, polyacetates, starch, gelatin, oil or wax is applied to enhance coherency to the filament. By way of example, and not limitation, suitable warp and weft yarns used in the fabric of this invention are multifilament yarns formed from polyamides such as nylon 6 and nylon 6,6 as well as polyesters, and polyacrilonitrile. Nylon 6,6 may be preferred. In the preferred embodiment, the multifilament yarn used in both the warp and the fill direction will be a flat filament, high entanglement yarn using a proprietary finish oil available from E.I. DuPont in Wilmington, Del. under the trade designation K-7389. By the term "flat filament" is meant a nontextured yarn wherein the individual filaments have not undergone any random interlacing thereof such as through the application of an external fluid force.

Looking again to FIG. 3, after the woven fabric 70 is formed it is passed over and around a plurality of take-up rolls 80, 81, 82 and thereafter passed to through an accumulator 84 by conveyor rolls 85–90. Importantly, it has been found beneficial to maximize the weight 92 on the take-up compensator arm up to a level of about 80 pounds. It has also been found beneficial to the reduction of creases to apply a combination of radiant and convective heat to the fabric 70 by means of a heater 94 just prior to placing the fabric on a removal roll 96. One such heater which is believed to be particularly suitable is a 4,000 watt Radiant unit model number PO-370AX26 with a model 965 control unit available from Watlow Industries whose business address is believed to be 12001 Lackland Road, St. Louis, Mo. 63146.

While the fabric of the present invention may be useful for a number of applications, this fabric is believed to be particularly useful for incorporation in automobile restraint cushions or airbags. As will be appreciated by those of skill in the art, such airbags oftentimes utilize a fabric coating to control permeability. In order to apply such coatings, however, sizing compounds such as polyacrylic acid as well as yarn oils entrapped by those sizing compounds must first be removed from the fabric by scouring and drying operations. Through the use of nonsized yarn, this scouring operation can now be completely eliminated since yarn oils are no longer entrained but may now be removed in the water-jet weaving process. Prior to the present invention, there was no known process available for the production of high weave density airbag fabrics using yarns free of sizing compounds. Specifically, the use of Rapier or air-jet weaving machines with yarns having no sizing compound thereon leads to unacceptable yarn damage from the heat build-up and abrasion caused by the contact of the warp ends with moving parts inserted into the warp shed during the weaving process. The use of water-jet weaving avoids yarn damage due to heat build-up since the warp yarns are not in contact with moving parts during insertion of fill yarn through the warp shed. Accordingly, such water-jet woven fabrics represent a useful advancement over the prior art.

FIGS. 6 and 7 are merely representative of one type of usage and design for an airbag 103 which it will be understood preferably opens in opposing relation to a vehicle occupant 105 in the event of a collision. In the embodiment illustrated, the airbag 103 is fixed at its base to an inflator 107 which in turn is linked to a collision detection sensor (not shown). When the deceleration of the vehicle exceeds a certain level, the collision detection sensor sends a signal to the inflator 107 thereby inducing the chemical reaction of a gas generating agent to inflate the airbag 103 from the stowed position of FIG. 6 to the inflated position illustrated in FIG. 7. In the illustrated embodiment the airbag 103 is stowed in a steering wheel 109 although it is to be appreciated that the airbag 103 could also be positioned in any other location opposing a vehicle occupant including a dash panel, door panel or forward seat.

It is to be understood that the herein disclosed fabric construction may be used in various portions of the airbag where it is desired to maintain tear resistance and to control the flow of the inflation gases which enter the airbag during collision. Thus, coated and uncoated variations of the fabric may be used either as a face fabric where it is desired to have low permeability, at the back of the bag where higher permeability may be desired or at the sides of the bag where a preselected controlled degree of permeability may be desired. Moreover, that fabric which is used may be used directly without the need for any scouring operation prior to coating or formation into the airbag.

In accordance with the above description, it is seen that the present invention provides a fabric and airbag formed therefrom wherein the fabric is woven on a water-jet weaving machine at weave densities which have previously been achievable only on Rapier weaving machines. While specific embodiments of the invention have been illustrated and described, it is to be understood that the invention is not limited thereto, since modifications may be made and other embodiments of the principles of this invention will occur to those skilled in the art to which this invention pertains. Therefore, it is intended by the appended claims to cover any modifications and other embodiments as incorporate the features of this invention within the true spirit and scope of such claims.

What is claimed is:

1. A method for water-jet weaving a high weave density fabric for use in a vehicle airbag, the method comprising the steps of:

(a) conveying a plurality of warp yarns having a denier of about 630 or greater with no chemical sizing compound thereon through a water-jet weaving machine;

(b) inserting a plurality of fill yarns having a denier of about 630 or greater with no chemical sizing compound thereon between said plurality of warp yarns by means of a water-jet such that any yarn oils are at least partially removed by said water jet; and (c) beating said plurality of fill yarns into place between said warp yarns such that a fabric having a weave density of about 39 threads per inch or greater is produced.

2. The invention as in claim 1, wherein said fabric has a weave density of about 39 to 43 threads per inch.

3. The invention as in claim 1, wherein said warp yarns have a denier of between about 630 and about 680.

4. The invention as in claim 3, wherein said fill yarns have a denier of between about 630 and about 680.

5. A method for water-jet weaving a high weave density fabric for use in a vehicle airbag, the method comprising the steps of:

(a) conveying a plurality of warp yarns having a denier of about 840 or greater with no chemical sizing compound thereon through a water-jet weaving machine;

(b) inserting a plurality of fill yarns having a denier of between about 840 or greater with no chemical sizing compound thereon between said plurality of warp yarns by means of a water-jet such that any yarn oils are at least partially removed by said water jet; and (c) beating said plurality of fill yarns into place between said warp yarns such that a fabric having a weave density of about 34 threads per inch or greater is produced.

6. The invention as in claim 5, wherein said fabric has a weave density of about 34 to 36 threads per inch.

7. The invention as in claim 5, wherein said warp yarns have a denier of between about 840 to about 870.

8. The invention as in claim 7, wherein said fill yarns have a denier of between about 840 to about 870.

\* \* \* \* \*